May 30, 1967     J. M. SPENCER, JR     3,321,969
MARINE SPEEDOMETER
Filed April 19, 1965
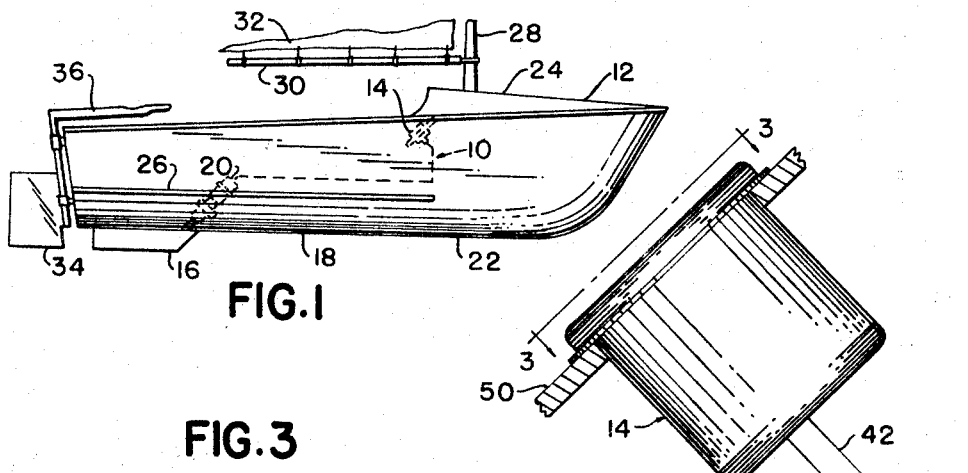
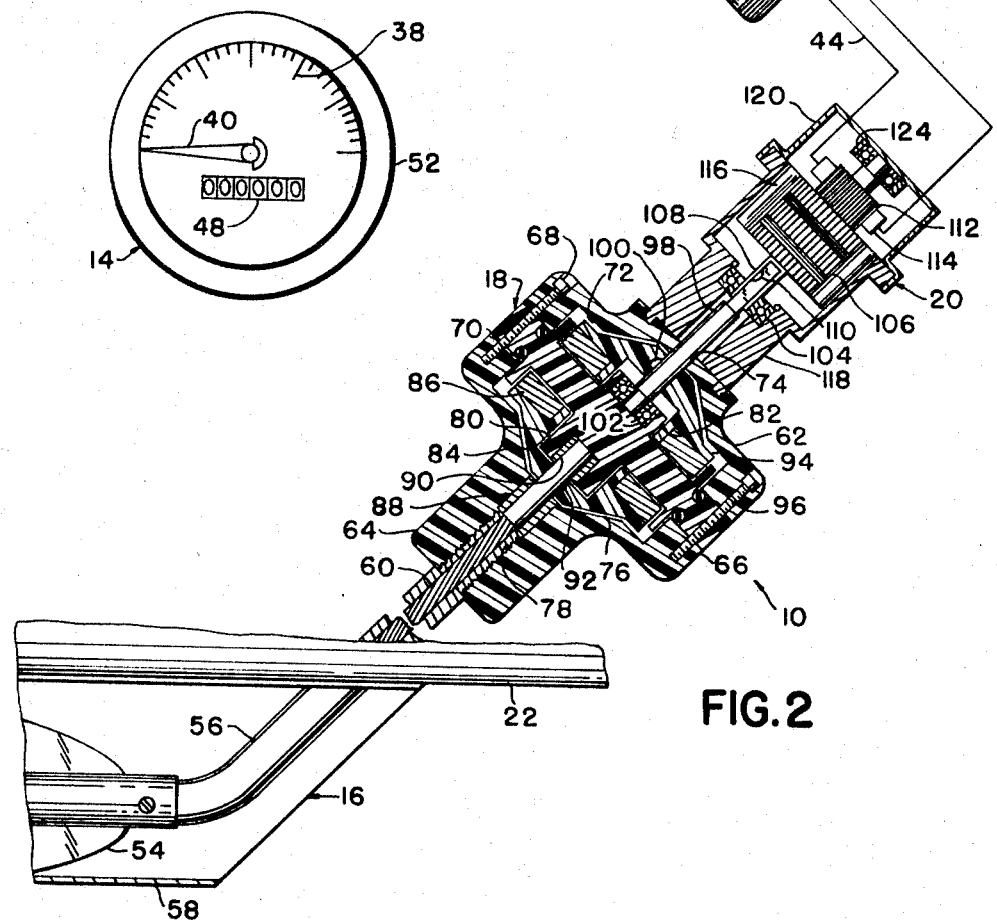
INVENTOR.
JAMES M. SPENCER JR.
BY *Whittemore,*
*Hulbert & Belknap*
ATTORNEYS

United States Patent Office 3,321,969
Patented May 30, 1967

3,321,969
MARINE SPEEDOMETER
James M. Spencer, Jr., 2515 Mercedes Drive,
Fort Lauderdale, Fla. 33316
Filed Apr. 19, 1965, Ser. No. 449,217
4 Claims. (Cl. 73—187)

The invention relates to movement sensing and indicating apparatus and refers more specifically to electro-mechanical apparatus for indicating the speed of travel and the distance travelled of a boat which includes no storage battery and requires no outside source of electric energy.

In the past electric instruments, such as speedometers, for indicating the speed of travel of a boat and odometers for indicating the distance travelled by a boat have been used only in conjunction with boats having separate sources of electric energy, such as a storage battery. In the prior speed and distance measuring apparatus an electric signal from a storage battery or other separate source of electric energy has been regulated to provide an energizing signal for the indicating instruments in accordance with the speed of travel of the boat through the water.

Electric speed and distance measuring instruments have not been readily available in the past for use with sailboats having no auxiliary power source for generation of electricity and no storage battery. Similarly in the smaller power boats, such as boats using outboard motors, speed and distance indicating apparatus has generally been mechanical rather than electro-mechanical due to the usual batteryless operation of such boats.

It is, therefore, an object of the invention to provide improved electro-mechanical apparatus for sensing and indicating the speed of travel and the distance travelled by a boat through water.

Another object is to provide electro-mechanical apparatus for indicating the speed of travel and distance of travel by a boat, having no separate source of electricity, through the water.

Another object is to provide a boat, an electric speedometer and odometer secured to the boat, a ship's log secured to the boat exteriorly and below the water line thereof, a watertight coupling connected to the ship's log for rotation thereby in accordance with the speed of the boat through the water and an electric generator connected between the coupling and the electric speedometer and odometer for generating an electric signal and energizing the speedometer and odometer in accordance with the speed of rotation of the coupling.

Another object is to provide structure as set forth above wherein the watertight coupling includes an upper and lower housing member each having a recess therein, a center housing member sandwiched between the upper and lower housing member, a pair of magnetic coupling members rotatably mounted within the recesses on opposite sides of the center housing member, a drive cable extending through the lower housing member connected to the lower coupling member and an output shaft connected to the upper coupling member extending through the upper housing member.

Another object is to provide structure as set forth above wherein the electric generator includes an armature secured to the output shaft of the watertight coupling for rotation therewith, fixed position permanent magnetic field members surrounding the armature, a commutator connected to the armature and generator brushes connected to a generator output circuit engaged with the commutator.

Another object is to provide a watertight coupling including an upper and a lower housing member each having a recess therein facing the other, a center housing member sandwiched between the upper member and lower housing members, a pair of magnetic coupling members rotatably mounted within the recesses on opposite sides of the center housing member, a drive cable extending through the lower housing member connected to the lower coupling member and an output shaft connected to the upper coupling member extending through the upper housing member.

Another object is to provide coupling structure as set forth above and further including an electric generator comprising an armature secured to the output shaft of the watertight coupling for rotation therewith, fixed position permanent magnetic field members surrounding the armature, a commutator connected to the armature and generator brushes connected to a generator output circuit engaged with the commutator.

Another object is to provide structure for indicating the speed of travel and distance travelled by a boat through the water which is simple in construction, economical to manufacture and efficient in use.

Other objects and features of the invention will become apparent as the description proceeds, especially when taken in conjunction with the accompanying drawing, illustrating a preferred embodiment of the invention, wherein:

FIGURE 1 is a diagrammatic representation of a boat including apparatus for measuring the speed and the distrance travelled of the boat through the water in accordance with the invention.

FIGURE 2 is an enlarged diagrammatic representation, partly in section of the apparatus for indicating the speed and the distance travelled of the boat illustrated in FIGURE 1.

FIGURE 3 is a plan view of the electric speedometer and odometer of the apparatus for indicating the speed and distance travelled of the boat illustrated in FIGURE 1 taken substantially on the line 3—3 in FIGURE 2.

With particular reference to the figures of the drawing, one embodiment of the present invention will now be considered in detail.

The apparatus 10 for sensing and indicating the speed and the distance travelled of a boat 12 through water is shown installed in the sailboat 12 in FIGURE 1. The apparatus 10 includes an electric speedometer and odometer 14, a ship's log 16, watertight coupling 18 and direct current generator 20.

As shown better in FIGURE 2, the coupling 18 is connected for rotation with the ship's log 16. The generator 20 is connected to the coupling 18 for rotation thereby and is connected to the speedometer and odometer 14 for energization thereof in accordance with the speed of rotation of the coupling 18.

Thus, in operation as the sailboat 12 passes through water the ship's log 16 will be rotated in accordance with the speed of the boat 12 through the water. The coupling 18 will, therefore, be rotated at a speed proportional to the speed of the boat through the water so that the signal from the generator 20 will be of a magnitude indicative of the speed of the boat 12 through the water, while the analog of or the cumulative signal from the generator 20 will be representative of the distance the boat 12 travels through the water. The electric speedometer and odometer 14 records the instantaneous value of the signal from generator 20 as an instantaneous speed indication and also records the analog of the generator signal to provide a distance indication.

More specifically the boat 12 may include the hull 22, a portion of which may be covered by the deck 24. The hull 22 has a water line which is normally above the longitudinally extending outwardly projecting member 26. The boat 12, as indicated, is a sailboat having a mast 28 and a boom 30 to which the sail 32 is secured. A rudder 34 having the tiller 36 secured thereto is used for guiding the boat 12 through the water. It will be particularly noted that the boat 12 is completely devoid of storage batteries or other separate sources of electric energy.

The electric speedometer and odometer 14 is a commercially obtainable instrument which will indicate speed on the dial 38 by means of pointer 40 which will move across the dial 38 in accordance with the magnitude of the electric signal applied to the speedometer and odometer 14 over the electric conductors 42 and 44 from generator 20. For a detailed study of such instruments, reference is made to the electric instrument Part No. 860–N, of the Stewart Warner Corporation. The speedometer and odometer 14 will not be considered in detail herein.

The particular ship's log 16 is illustrated in detail in applicant's Patent No. 3,173,164 and will, therefore, similarly not be considered in detail herein. The ship's log 16 however includes the propeller 54 positioned on the end of the rigid tube 56 secured to the hull 22 of the boat 12. The propeller rotates within the propeller guard 58 in accordance with the speed of the boat 12 through the water. The propeller 54 is connected to the flexible cable 60 within the tube 56 to produce rotation thereof with the propeller.

The watertight coupling 18 includes upper housing member 62, lower housing member 64 and the center housing member 66 sandwiched therebetween, all of which are constructed of suitable hard rubber or similar plastic material. The upper and lower housing members 62 and 64 and the center housing member 66 are secured together by means of screws 68 provided around the periphery thereof. Watertight seals are provided between the upper and lower housing members 62 and 64 and the center housing member 66 by the annular sealing rings 70 clamped therebetween.

The upper housing member 62 is provided with the circular recess 72 in the lower surface thereof concentric with the opening 74 passing axially therethrough. The lower housing member 64 is provided with a similar circular recess 76 and axially extending passage 78 extending therethrough, as shown best in FIGURE 2. The center housing member 66 is provided with bearing stubs 80 and 82 extending from the opposite sides thereof concentric with the openings 74 and 78 in the upper and lower housing members.

A lower magnetic coupling member 84 which is circular in plan and which includes a plurality of angularly spaced apart magnets 86 recessed in the upper outer periphery thereof is sleeved over the bearing stub 80 on the center housing member 66 and is positioned within the recess 76 in the lower housing member 64 for rotation therein.

The tube 56 is threaded into the opening 78 through the lower housing member 64 while the flexible cable 60 extends through the bearing 88 in the axial passage 78 and terminates within a bearing 90 recessed in the stub 80 of the center housing member 66. The flexible cable 60 is rigidly secured to the lower coupling member 84 as by means of a key 92. Thus, on rotation of the flexible cable 60 the coupling member 84 will be caused to rotate in the recess 76.

A second magnetic coupling member 94 having a plurality of magnets 96 around the lower outer periphery thereof is mounted on the bearing stub 80 of the center housing member within the recess 72 in the upper housing member 62. The coupling member 94 is rigidly secured to the output shaft 98 by means of a key 100 or the like. The lower end of the output shaft 98 is supported in bearings 102 carried by center housing member 66, while the upper end of the output shaft 98 is supported in bearings 104 carried by generator 20.

On rotation of the lower coupling member 84 with the flexible cable 60 the upper coupling member 94 is caused to rotate the output shaft 98 of the coupling 18.

The electrical generator 20 is a direct current generator and includes an armature winding 106 supported on shaft 108 which is connected by convenient means, such as a key 110, to the shaft 98 for rotation therewith. A split commutator 12 connected electrically to armature winding 106 is secured to the shaft 108 while generator brushes 114 connected to electric conductors 42 and 44 are positioned on the commutator 112 to receive the electric signal generated in the armature 106 from the commutator 112. The generator 20 is completed by the fixed position magnets 116 providing a permanent magnetic field in which the armature 106 is rotated on rotation of the shaft 108.

Generator 20 is enclosed by the generally cylindrical lower housing member 118 and upper housing member 120. The lower housing member 118 is secured in the upper housing member 62 of the coupling 18, as shown best in FIGURE 2. As illustrated best in FIGURE 2 the electric conductors 42 and 44 connect the generator brushes 114 to the speedometer 14.

Thus, in over-all operation the propeller 54 of the ship's log 16 is rotated at a speed directly proportional to the speed of the boat 12 through water. The propeller 54 thus produces rotation of the flexible cable 60 to which it is secured whereby the lower magnetic coupling member 84 is rotated within the watertight coupling 18. Due to magnetic coupling between the lower magnetic coupling member 84 and the upper magnetic coupling member 94, the upper magnetic coupling member 94 is also rotated at a speed proportional to the speed of the boat 12 through the water. No water which might find its way through the tube 56 along with the flexible cable 60 is however allowed to pass the center housing member 66 due to the provision of the sealing rings 70 and the fixed relation of the housing members.

Rotation of the upper magnetic coupling member 94 produces rotation of shafts 98 and 108 whereby the armature 106 of generator 20 is caused to rotate in the fixed magnetic field provided by the permanent magnets 116 to produce an electric signal in the armature 106 proportional to the speed of travel of the boat 12 through the water. The electric signal generated in the armature 106 is passed to the speedometer and odometer 14 through the split commutator 112 and the generator brushes 114 connected to the electrical conductors 42 and 44.

The electric signal from the generator 20 is used by the speedometer and odometer 14 to indicate the speed of the boat 12 by movement of needle 40 over dial 38. Further the speedometer and odometer 14 provides an analog indication of the electric signal received over the conductors 42 and 44 to provide an indication of the distance travelled by the boat on the dial 48.

While one embodiment of the present invention has been disclosed in detail, it will be understood that other embodiments and modifications are contemplated by the inventor. It is the intention to include all embodiments and modifications of the invention as are defined by the appended claims within the scope of the invention.

What I claim as my invention is:

1. In combination, a boat, a ship's log secured to the boat exterior thereof below the water line thereof, electric indicating means secured to the boat, and means positioned between the ship's log and the electric indicating means for developing an electric signal proportional to the speed of travel of the boat through the water in response to rotation of the ship's log for actuation of the electric indicating means including a watertight coupling connected to the ship's log at one end and a direct current generator connected to the coupling at the other end and to the electric indicating means, said watertight coupling comprising a lower housing member having an axial opening extending therethrough and a recess in the upper side thereof aligned with the axial opening, an upper housing member having an axial opening therethrough aligned with the axial opening in the lower housing member and including a recess in the lower side thereof concentric with the axial opening through the upper member, a generally flat center housing member sandwiched between and rigidly secured to the upper and lower housing members, a first magnetic coupling member connected to the ship's log positioned in the recess in the lower housing member for rotation thereabout on rotation of the ship's log and a second magnetic coupling member positioned in the recess in the upper housing member magneticaly connected to the lower magnetic coupling member for rotation therewith.

2. Structure as set forth in claim 1 wherein the direct current generator comprises an armature secured to the coupling output shaft for rotation therewith, a fixed magnet positioned adjacent the armature to provide a magnetic field therefor and a split commutator electrically connected to the armature for rotation therewith and generator brushes engaged with the split commutator for removal of electric energy from the direct current generator.

3. In combination, a boat having no battery or other separated included source of electricity, a ship's log secured to the boat exterior thereof below the water line thereof, electric indicating means secured to the boat for indicating the speed of the boat through the water and for recording the distance the boat travels through the water in response to an electric signal provided thereto, and batteryless means positioned between the ship's log and the electric means for indicating the speed and distance travelled of the boat for developing an electric signal proportional to the speed of travel of the boat through the water in response to rotation of the ship's log for actuation of the electric indicating means including a watertight coupling connected to the ship's log at one end and a direct current generator connected to the coupling at the other end and to the electric indicating means, said watertight coupling comprising a lower plastic housing member having an axial opening extending therethrough and a recess in the upper side thereof aligned with the axial opening, an upper housing member having an axial opening therethrough aligned with the axial opening in the lower housing member and including a recess in the lower side thereof concentric with the axial opening through the upper member, a generally flat center housing member sandwiched between and rigidly secured to the upper and lower housing members, sealing means between the upper, center and lower housing members, a bearing stud extending from each of the opposite sides of the center housing member, a first magnetic coupling member connected to the ship's log positioned in the recess in the lower housing member and mounted on the bearing stud on the lower side of the center housing member for rotation thereabout on rotation of the ship's log and a second magnetic coupling member positioned in the recess in the upper housing member magnetically connected to the lower magnetic coupling member for rotation therewith about the stud on the upper side of the center housing member and an output shaft connected to the upper magnetic coupling member.

4. Structure as set forth in claim 3 wherein the direct current generator comprises an armature secured to the coupling output shaft for rotation therewith, a fixed magnet positioned adjacent the armature to provide a magnetic field therefor and a split commutator electrically connected to the armature for rotation therewith and generator brushes engaged with the split commutator for removal of electric energy from the direct current generator.

References Cited

UNITED STATES PATENTS

| 2,127,847 | 8/1938 | Schulte | 73—187 |
| 3,071,964 | 1/1963 | Hess | 73—181 |
| 3,085,407 | 4/1963 | Tomlinson | 64—30 |

LOUIS R. PRINCE, *Primary Examiner.*

N. B. SIEGEL, *Assistant Examiner.*